| United States Patent [19] | [11] Patent Number: 4,599,396 |
|---|---|
| Takekoshi et al. | [45] Date of Patent: Jul. 8, 1986 |

[54] CRYSTALLINE POLYETHERIMIDES AND POLYAMIC ACID PRECURSORS THEREFOR

[75] Inventors: Tohru Takekoshi, Scotia; Patricia P. Anderson, Albany, both of N.Y.

[73] Assignee: General Electric Company, Schenectady, N.Y.

[21] Appl. No.: 647,286

[22] Filed: Sep. 4, 1984

[51] Int. Cl.⁴ .............................................. C08G 73/10
[52] U.S. Cl. .................... 528/185; 528/352; 528/353
[58] Field of Search .................. 528/185, 352, 353

[56] References Cited

U.S. PATENT DOCUMENTS

| 4,417,044 | 11/1983 | Parekh | 528/185 |
|---|---|---|---|
| 4,429,102 | 1/1984 | Evans et al. | 528/185 |
| 4,443,591 | 4/1984 | Schmidt et al. | 528/185 |
| 4,444,979 | 4/1984 | St. Clair et al. | 528/172 |

OTHER PUBLICATIONS

St. Clair et al., *J. Poly. Sci., Polymer Chem. Ed.*, 15, 1529-1533, (1977).
Takekoshi et al., *ACS Polymer Preprints*, 24, 312 (1983).
Adrova et al., *Polyimides* (Stamford, CT: Technomic Pub. Co., 1970), pp. 1, 102-103.

*Primary Examiner*—Lester L. Lee
*Attorney, Agent, or Firm*—William H. Pittman; James C. Davis, Jr.; James Magee, Jr.

[57] ABSTRACT

Crystalline polyetherimides having equilibrium melting points below 400° C. are obtained by the reaction of various p-linked polycyclic tetracarboxylic acids or their functional derivatives with p-linked polycyclic diamines. The structural units in said crystalline polyetherimides contain at least 7 aromatic rings.

20 Claims, No Drawings

CRYSTALLINE POLYETHERIMIDES AND POLYAMIC ACID PRECURSORS THEREFOR

This invention relates to polyetherimides and more particularly crystalline polyetherimides, and to polyamic acid precursors therefor.

Polyetherimides are a known class of polymers characterized by advantageous properties such as thermal stability and solvent resistance. They are illustrated by polymers prepared by the reaction of aromatic diamines such as m-phenylenediamine with aromatic ether dianhydrides, typically 2,2-bis[4-(3,4-dicarboxyphenoxy)phenyl]propane dianhydride ("bisphenol A dianhydride"). Various polyetherimides of this type are in commercial use as engineering resins.

It is known that crystalline polymers are in general more resistant to solvent action than closely related amorphous polymers. However, two factors make it difficult to prepare crystalline polyetherimides which are adaptable to commercial production and use. The first is that it is extremely difficult to predict crystallinity from molecular structure. The second is the extremely high equilibrium melting points of many known crystalline polyetherimides. For example, the crystalline polymer prepared from bis(3,4-dicarboxyphenyl)ether dianhydride and m-phenylenediamine has an equilibrium melting point (Tm) of 490° C., and the product of the same dianhydride and 1,4-bis(4-aminophenoxy)benzene has a Tm of 450° C. Similarly, the Tm values for the crystalline polyetherimides prepared from bis[4-(3,4-dicarboxyphenoxy)phenyl]sulfide and p-phenylenediamine and benzidine, respectively, are 425° and 483° C. While polyetherimides are quite thermally stable, such stability does not generally extend to temperatures substantially above 400° C. Therefore, Tm values at or above this figure make it difficult or impossible to process the polymers once they are obtained.

A principal object of the present invention, therefore, is to provide a chemical class of crystalline polyetherimides having closely related molecular structures, as well as polyamic acid precursors therefor.

A further object is to provide crystalline polyetherimides having Tm values low enough to permit convenient processing and fabrication.

A still further object is to provide crystalline polymers having many of the desirable properties of commercially available polyetherimides.

Other objects will in part be obvious and will in part appear hereinafter.

In its broadest sense, the present invention comprises polymers selected from the group consisting of crystalline polyetherimides having equilibrium melting points below 400° C. and polyamic acid precursors therefor, said polymers consisting essentially of structural units of formula I

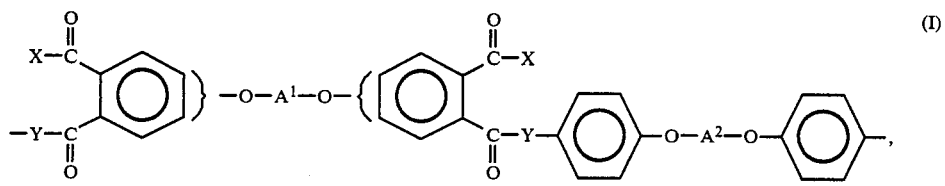

wherein each of $A^1$ and $A^2$ has formula II

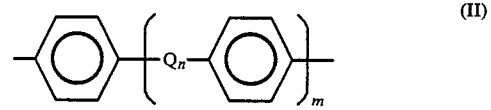

O is divalent oxygen or sulfur; each of m and n is 0 or 1; X is OH and Y is NH, or X and Y taken together are N; said structural units containing at least 7 aromatic rings.

As will be apparent from formula I, the polymers of this invention are polyetherimides in which X and Y taken together are N and polyamic acid precursors therefor in which X is OH and Y is NH. Also included are mixed polyetherimide-polyamic acid polymers. As indicated by the braces, each O—$A^1$ moiety is para to one of the C=O moieties; when X and Y taken together are N, the two C=O moieties are, of course, equivalent.

The $A^1$ and $A^2$ values may be the same or different, but each is within a relatively small class of related p-linked radicals comprising the 1,4-phenylene, 4,4'-biphenylene, bis(4-phenylene)ether and bis(4-phenylene)sulfide radicals. Thus, the polymers may be considered as being obtainable by the reaction of tetracarboxylic acids or functional derivatives (e.g., dianhydrides, esters or bisimides) thereof with diamines, the following compounds being included;

Tetracarboxylic acids: 1,4-bis(3,4-dicarboxyphenoxy)benzene, 4,4'-bis(3,4-dicarboxyphenoxy)biphenyl, bis[4-(3,4-dicarboxyphenoxy)phenyl]ether, bis[4-(3,4-dicarboxyphenoxy)phenyl]sulfide.

Diamines: 1,4-bis(4-aminophenoxy)benzene, 4,4'-bis(4-aminophenoxy)biphenyl, bis[4-(4-aminophenoxy)phenyl]ether, bis[4-(4-aminophenoxy)phenyl]sulfide.

The above-listed p-linked tetracarboxylic acids (and their functional derivatives) and diamines are known in the art and may be prepared by known methods. For example, the diamines may be prepared by a nucleophilic aromatic substitution reaction of p-chloronitrobenzene with the disodium salt of a compound of the formula HO—$A^2$—OH, followed by reduction of the nitro groups. Similarly, a 4-nitrophthalimide may be reacted with the disodium salt of a compound of the formula HO—$A^1$—OH and the resulting bisimide converted to a dianhydride. The disclosure of U.S. Pat. No. 3,879,428 is incorporated by reference herein for its description of similar nucleophilic substitution reactions and conversions of bisimides to dianhydrides.

A further characteristic of the polymers of this invention is that the structural units therein contain at least 7 aromatic rings. As used herein, the term "aromatic ring" means a 6-membered carbocyclic aromatic ring. Since each of the above-listed tetracarboxylic acids and diamines has 3 or 4 such rings, the structural units in the individual polymers of this invention may contain either 7 or 8 rings.

Finally, the polyetherimides of the present invention must have equilibrium melting point (Tm) values below 400° C. As a general rule, the Tm values are in the range of 200°–370° C.

The concept of crystallinity is treated in considerable detail in Encyclopedia of Polymer Science and Technology, Vol. 4, pp. 449–528 (1966). As explained therein, the fact that a polymer is considered crystalline does not mean that the entire polymer crystallizes. Rather, it means that there are crystalline domains of substantial size in the polymer mass. For the purposes of this invention, a polymer is considered crystalline if it has an equilibrium melting point, which is defined as the temperature at which the last crystalline material becomes liquid.

The polyetherimides of this invention may be prepared by solution polymerization or melt polymerization, typically at temperatures within the range of about 125°–200° C. Because of the relative insolubility of said polyetherimides in most solvents, it is usually necessary to use a hydroxyaromatic solvent such as m-cresol, optionally in admixture with an aromatic hydrocarbon such as toluene or xylene which facilitates water removal by forming an azeotrope therewith. The molar ratio of diamine to dianhydride is usually between about 0.95:1 and about 1.05:1, with values of approximately 1:1 being preferred for the formation of high molecular weight polymers. The use of an end-capping agent such as phthalic anhydride may be desirable in certain instances in order to avoid an undesirably high melt viscosity. Such end-capping agents, if present, typically comprise about 0.2–4.0 mole percent of the total anhydrides.

The polyetherimides of this invention may also be prepared in a two-stage process in which the first stage is the formation of a polyamic acid of the invention and the second stage is the imidazation of said polyamic acid. The first stage is typically carried out at a temperature within the range of about 25°–100° C. in a solvent which may be a hydroxyaromatic solvent such as those enumerated above, but is most often an ether such as diethylene glycol dimethyl ether or a dipolar aprotic solvent such as dimethylformamide, dimethylacetamide, dimethyl sulfoxide or N-methylpyrrolidone. In the second stage, the polyamic acid is converted to the polyimide, typically by heating in the range of about 180°–375° C. and in the substantial absence of solvents. The two-stage process is particularly advantageous when a polyetherimide film or fiber-reinforced composite is desired.

It is also possible to prepare the polyetherimides of this invention by the reaction of a diamine with a bisimide of an amine containing an electron-deficient radical, as disclosed in copending, commonly assigned application Ser. No. 505,636, filed June 20, 1983, the disclosure of which is incorporated by reference herein. Generally, the electron-deficient radical is derived from an amine Z—NH₂ which comprises at least 10 mole percent, most often at least about 30 mole percent and preferably at least about 50 mole percent, of the free amine constituents of an equilibrated mixture from the reaction represented by equation III

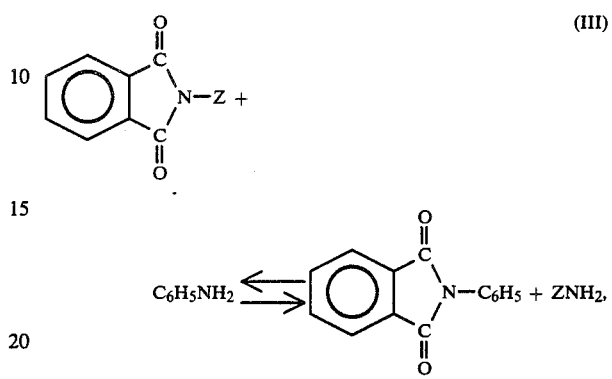

It is preferred that the amine Z—NH₂ have a boiling point at atmospheric pressure less than about 300° C., usually less than 250° C., more preferably less than about 210° C. and most desirably less than 180° C. A maximum boiling point of about 300° C. is mandatory, and the above-noted lower boiling points still more preferred, when said amine comprises less than about 75 mole percent of the free amine constituents of the equilibrated mixture. The lower boiling points are preferred in order that the equilibrium may be easily shifted in favor of polyimide formation during reaction with a diamine.

Methods for bringing the reaction represented by equation III to equilibrium and analyzing the equilibrated mixture will be apparent to those skilled in the art. In a typical method, a mixture of 0.005 mole each of aniline and the N-(Z-substituted)phthalimide is placed in a 10-ml. stainless steel reactor which is the purged with nitrogen, sealed and heated at 250° C. for one hour in a constant temperature bath. The tube is then removed, cooled and opened and the reaction mixture is sampled and analyzed by high pressure liquid-liquid chromatography.

The principal chemical characteristic of the Z value is its high degree of electron deficiency. For the most part, suitable electron-deficient groups comprise aromatic hydrocarbon radicals containing one or more strongly electron-withdrawing substituents and heterocyclic radicals having aromatic character.

Suitable aromatic hydrocarbon radicals include phenyl, naphthyl and the like containing such substituents as halo, nitro, keto, carbalkoxy, cyano and perfluoroalkyl. At least one of said electron-withdrawing substituents is preferably ortho or para to the free valence bond (i.e., the one attached to the amino group in Z—NH₂). The trifluoromethylphenyl radicals are particularly preferred.

Suitable heterocyclic radicals having aromatic character include those with 5- or 6-membered rings and aromatic unsaturation of the type existing in pyrrole and pyridine. These radicals preferably contain 1–3 and especially 1 or 2 hetero atoms of which at least one is nitrogen and the others, if present, are nitrogen or sulfur. They are usually unsubstituted but may be substituted, especially with electron-withdrawing substituents such as those previously enumerated. The free valence bond is preferably in the 2- or 4-position with respect to a hetero atom. If the ring contains more than one hetero atom and especially if it is 5-membered, the free valence bond is preferably attached to the single carbon atom between two of said hetero atoms.

Illustrative 5-membered heterocyclic radicals are pyrrolyl, 2-thiazolyl, 2-imidazolyl and 2-(1,3,4-thiadiazolyl). Illustrative 6-membered radicals are 2-pyridyl, 3-pyridyl, 4-pyridyl, 2-pyrimidyl, 2-pyrazyl, 2-(1,4-thiazolyl) and 2-(1,3-thiazolyl). Particularly preferred Z values are the aminopyridyl radicals, especially 2-pyridyl and 4-pyridyl.

By reason of their crystallinity, the polyetherimides of this invention are highly resistant to solvent action. In general, they are soluble in substantial proportions only in hydroxyaromatic solvents such as m-cresol and o-chlorophenol, and frequently only at elevated temperatures. Their Tm values are, as previously noted, generally within the range of about 200°–370° C.

The preparation of crystalline polyetherimides of the present invention is illustrated by the following examples.

EXAMPLES 1-13

Mixtures of 8.82 gram-moles of dianhydride, 0.18 gram-mole of phthalic anhydride, 9.0 gram-moles of diamine, 32 ml. of m-cresol and 8 ml. of toluene were prepared from the diamines and dianhydrides listed in Table I and heated to reflux under nitrogen with stirring. Refluxing was continued as water was removed by distillation. After one hour, a trap filled with 4-Angstrom molecular sieves was inserted in the distillation system and refluxing was continued for another two hours. The reaction mixture was diluted with about 30 ml. of m-cresol, cooled and poured into methanol, with stirring. The precipitated polymer was filtered, washed with methanol and dried under vacuum at 100° C.

The polymers of Examples 1-13 were all insoluble in chloroform, toluene, dimethylacetamide and dimethyl sulfoxide. Various temperatures (all in degrees Centigrade) and solubility parameters for said polymers are given in Table II. A comparison of the Tm and thermogravimetric analysis (TGA) (in nitrogen and air) values gives an indication of the processing "windows" for the polyetherimides of this invention.

TABLE I

| Example | $A^1$ | $A^2$ |
| --- | --- | --- |
| 1 | 1,4-Phenylene | 4,4'-Biphenylene |
| 2 | " | Bis(4-phenylene) ether |
| 3 | " | Bis(4-phenylene) sulfide |
| 4 | 4,4'-Biphenylene | 1,4-Phenylene |
| 5 | " | 4,4'-Biphenylene |
| 6 | " | Bis(4-phenylene) ether |
| 7 | " | Bis(4-phenylene) sulfide |
| 8 | Bis(4-phenylene) ether | 1,4-Phenylene |
| 9 | " | 4,4'-Biphenylene |
| 10 | " | Bis(4-phenylene) sulfide |
| 11 | Bis(4-phenylene) sulfide | 1,4-Phenylene |

TABLE I-continued

| Example | $A^1$ | $A^2$ |
| --- | --- | --- |
| 12 | | 4,4'-Biphenylene |
| 13 | | Bis(4-phenylene) sulfide |

TABLE II

| Example | TG | TM | TGA Nitrogen | TGA Air | Solubility N-Methylpyrrolidone | Solubility m-Cresol | Solubility o-Chlorophenol |
| --- | --- | --- | --- | --- | --- | --- | --- |
| 1 | 230 | 364 | 520 | 470 | i | s | s |
| 2 | 210 | 291 | 560 | 535 | i | s | i |
| 3 | 201 | 333 | 490 | 490 | i | i | ss |
| 4 | 222 | 357 | 565 | 530 | i | i | i |
| 5 | 220 | 361 | 530 | 510 | i | i | i |
| 6 | 208 | 290 | 540 | 460 | ss | s | s |
| 7 | 206 | 334 | 520 | 520 | i | i | i |
| 8 | 203 | 316 | 545 | 530 | i | i | i |
| 9 | 211 | 334 | 515 | 480 | i | i | i |
| 10 | 194 | 296 | 520 | 505 | i | i | i |
| 11 | 201 | 280 | 490 | 490 | ss | s | s |
| 12 | 205 | 325 | 470 | 440 | i | i | i |
| 13 | 186 | 328 | 515 | 500 | i | s | s | s = soluble; ss = slightly soluble; i = insoluble

The crystalline polyetherimides of this invention may be used for the formation of films, molding compounds, fiber-reinforced composites, coatings and the like. Their use is of particular advantage where high solvent resistance is desired. Typical areas of utility are in automobile and aviation applications for structural, decorative and protective purposes, as high temperature electrical insulators and dielectrics for capacitors, as coil and cable wrappings, for containers and container linings, in laminating structures for application as films to various heat-resistant or other types of materials, and as filled compositions where the fillers may be asbestos, mica, glass fiber or the like. Other uses include as binders for asbestos fibers, carbon fibers and other fibrous materials in making brake linings, and for formulation of molding compositions using fillers such as asbestos, glass fibers, talc, quartz, wood flour, finely divided carbon and silica. Other uses are similar to those described in U.S. Pat. No. 3,983,093, the disclosure of which is incorporated by reference herein.

What is claimed is:

1. A polymer selected from the group consisting of crystalline polyetherimides having equilibrium melting points below 400° C. and polyamic acid precursors therefor, said polymer consisting essentially of structural units of formula I in the drawings, wherein $A^1$ is the 1,4-phenylene radical, $A^2$ is the 4,4'-biphenylene, bis(4-phenylene)ether or bis(4-phenylene)sulfide radical, and X is OH and Y is NH or X and Y taken together are N.

2. A polymer according to claim 1 which is a polyetherimide wherein X and Y taken together are N.

3. A polymer selected from the group consisting of crystalline polyetherimides having equilibrium melting points below 400° C. and polyamic acid precursors therefor, said polymer consisting essentially of structural units of formula I in the drawings, wherein $A^1$ is the 4,4'-biphenylene radical, $A^2$ is the 4,4'-biphenylene, bis(4-phenylene)ether or bis(4-phenylene)sulfide radical, and X is OH and Y is NH or X and Y taken together are N.

4. A polymer according to claim 3 which is a polyetherimide wherein X and Y taken together are N.

5. A polymer according to claim 2 wherein $A^2$ is the 4,4'-biphenylene radical.

6. A polymer according to claim 2 wherein $A^2$ is the bis(4-phenylene)ether radical.

7. A polymer according to claim 2 wherein $A^2$ is the bis(4-phenylene)sulfide radical.

8. A polymer selected from the group consisting of crystalline polyetherimides having equilibrium melting points below 400° C. and polyamic acid precursors therefor, said polymer consisting essentially of structural units of formula I in the drawings, wherein $A^1$ is the bis(4-phenylene)ether radical, $A^2$ is the 1,4-phenylene, 4,4'-biphenylene or bis(4-phenylene)sulfide radical, and X is OH and Y is NH or X and Y taken together are N.

9. A polymer according to claim 8 which is a polyetherimide wherein X and Y taken together are N.

10. A polymer according to claim 4 wherein $A^2$ is the 4,4'-biphenylene radical.

11. A polymer according to claim 4 wherein $A^2$ is the bis(4-phenylene)ether radical.

12. A polymer according to claim 4 wherein $A^2$ is the bis(4-phenylene)sulfide radical.

13. A polymer selected from the group consisting of crystalline polyetherimides having equilibrium melting points below 400° C. and polyamic acid precursors therefor, said polymer consisting essentially of structural units of formula I in the drawings, wherein $A^1$ is the bis(4-phenylene)sulfide radical, $A^2$ is the 1,4-phenylene, 4,4'-biphenylene or bis(4-phenylene)sulfide radical, and X is OH and Y is NH, or X and Y taken together are N.

14. A polymer according to claim 9 where $A^2$ is the 1,4-phenylene radical.

15. A polymer according to claim 9 wherein $A^2$ is the 4,4'-biphenylene radical.

16. A polymer according to claim 9 wherein $A^2$ is the bis(4-phenylene)sulfide radical.

17. A polymer according to claim 13 which is a polyetherimide wherein X and Y taken together are N.

18. A polymer according to claim 17 where $A^2$ is the 1,4-phenylene radical.

19. A polymer according to claim 17 wherein $A^2$ is the 4,4'-biphenylene radical.

20. A polymer according to claim 17 wherein $A^2$ is the bis(4-phenylene)sulfide radical.

* * * * *

UNITED STATES PATENT AND TRADEMARK OFFICE
CERTIFICATE OF CORRECTION

PATENT NO. : 4,599,396

DATED : July 8, 1986

INVENTOR(S) : Tohru Takekoshi and Patricia P. Anderson

It is certified that error appears in the above-identified patent and that said Letters Patent is hereby corrected as shown below:

Column 2, line 21, beginning of line, "O" should read --Q--.
Column 6, line 12 (headings in Table II), "TG" should read --Tg-- and "TM" should read --Tm--.

Signed and Sealed this

Eighteenth Day of November, 1986

Attest:

DONALD J. QUIGG

Attesting Officer        Commissioner of Patents and Trademarks